(12) United States Patent
Rajamony et al.

(10) Patent No.: US 8,966,219 B2
(45) Date of Patent: Feb. 24, 2015

(54) ADDRESS TRANSLATION THROUGH AN INTERMEDIATE ADDRESS SPACE

(75) Inventors: Ramakrishnan Rajamony, Austin, TX (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2029 days.

(21) Appl. No.: 11/928,125

(22) Filed: Oct. 30, 2007

(65) Prior Publication Data
US 2009/0113164 A1 Apr. 30, 2009

(51) Int. Cl.
*G06F 12/10* (2006.01)

(52) U.S. Cl.
CPC ........ *G06F 12/1063* (2013.01); *G06F 12/1072* (2013.01)
USPC .................................. 711/203; 711/E12.065

(58) Field of Classification Search
None
See application file for complete search history.

(56) References Cited

U.S. PATENT DOCUMENTS

| 5,230,045 | A | * | 7/1993 | Sindhu | 711/203 |
| 5,237,671 | A | * | 8/1993 | Freitas et al. | 711/207 |
| 5,708,790 | A | | 1/1998 | White et al. | |
| 6,907,494 | B2 | * | 6/2005 | Arimilli et al. | 711/5 |
| 7,103,748 | B2 | * | 9/2006 | Day et al. | 711/207 |

* cited by examiner

*Primary Examiner* — Christian P Chace
*Assistant Examiner* — Eric Loonan
(74) *Attorney, Agent, or Firm* — Russell Ng PLLC; William Stock

(57) ABSTRACT

In a data processing system capable of concurrently executing multiple hardware threads of execution, an intermediate address translation unit in a processing unit translates an effective address for a memory access into an intermediate address. A cache memory is accessed utilizing the intermediate address. In response to a miss in cache memory, the intermediate address is translated into a real address by a real address translation unit that performs address translation for multiple hardware threads of execution. The system memory is accessed with the real address.

18 Claims, 6 Drawing Sheets

ADDRESS TRANSLATION THROUGH AN INTERMEDIATE ADDRESS SPACE

BACKGROUND OF THE INVENTION

1. Technical Field

The present invention relates in general to data processing and, in particular, to address translation in a data processing system employing memory virtualization.

2. Description of the Related Art

A computer system typically includes one or more processors coupled to a hierarchical data storage system. The computer system's hierarchy of data storage devices often comprises processor registers, cache memory, and system memory (e.g., SRAM or DRAM), as well as additional data storage devices such as hard disks, optical media, and/or magnetic tapes.

Regardless of the computer system architecture that is employed, it is typical that each processor accesses data residing in memory-mapped storage locations (whether in physical system memory, cache memory or another system resource) by utilizing real (or physical) addresses to identify the storage locations of interest. An important characteristic of real (or physical) addresses is that there is a unique real address for each memory-mapped physical storage location.

Because the one-to-one correspondence between memory-mapped physical storage locations and real addresses necessarily limits the number of storage locations that can be referenced to $2^N$, where N is the number of bits in the real address, the processors of most commercial computer systems employ memory virtualization to enlarge the number of addressable locations. In fact, the size of the virtual memory address space can be orders of magnitude greater than the size of the real address space. Thus, in a conventional systems, processors internally reference memory locations by the effective addresses and then perform effective-to-real address translations (often via one or more virtual address spaces) to access the physical memory locations identified by the real addresses.

In a virtual memory system, a page frame (and/or block) table is commonly maintained at least partially in system memory in order to track the mapping between the logical address space(s) and the physical address space. A typical entry in a page or block table includes a valid bit, which indicates whether the page/block is currently resident in system memory, a dirty bit, which indicates whether a program has modified the block, protection bits, which control access to the page/block, and a real page/block number (i.e., the physical address) for the page/block of virtual memory, if the page/block is resident in system memory.

To minimize the latency of address translation, processors typically contain a number of address translation data structures that cache address translations for recently accessed memory pages. For example, an exemplary computer system employing two-level translation from effective addresses to virtual addresses to real addresses may include data and instruction effective-to-real address translation (ERAT) tables that buffer only the most recent translations to facilitate direct effective-to-real address translation, a software-managed segment lookaside buffer (SLB) that buffers recently used effective-to-virtual address translations, and a hardware-managed translation lookaside buffer (TLB) that buffers recently used virtual-to-real address translations. In addition, some virtual memory systems provide an additional address translation buffer called a block address translation (BAT) buffer, which serves as a TLB for variable sized memory blocks.

In operation, when a processor generates the effective address of a memory access, the processor performs an ERAT lookup. If the effective address hits in the ERAT, the real address can be obtained relatively quickly. However, if the effective address misses in the ERAT, the SLB and TLB or BAT are accessed to perform a full effective-to-virtual-to-real address translation. If a miss occurs at this second level of address translation, the translation hardware invokes a page table walk engine to access the required translation entry from cache or system memory. Once the real address is obtained, the memory access is performed in cache memory or system memory.

As real memory capacities, program footprints, and user working sets continue to grow, it is beneficial to increase the coverage of translation information buffered in a processor. Common approaches to increasing the translation coverage include increasing the number of ERAT, SLB and TLB entries and supporting larger memory pages. For example, in addition to conventional 4 kilobyte (4 KB) and 16 KB pages, many systems now additionally support page sizes of 1 megabyte (MB), 16 MB, and 16 gigabyte (GB). However, increasing the number of ERAT, SLB, and TLB entries becomes expensive, both in terms of chip area, power dissipation, and the latency to perform a search for a matching translation entry in a large translation data structure. In addition, use of multiple memory page sizes and providing support for larger page sizes injects additional complexity into processor designs and can cause increased memory fragmentation.

SUMMARY OF THE INVENTION

According to one embodiment, a data processing system capable of concurrently executing multiple hardware threads of execution includes an intermediate address translation unit in a processing unit translates an effective address for a memory access into an intermediate address. A cache memory is accessed utilizing the intermediate address. In response to a miss in cache memory, the intermediate address is translated into a real address by a real address translation unit that performs address translation for multiple hardware threads of execution. The system memory is accessed with the real address.

DETAILED DESCRIPTION OF ILLUSTRATIVE EMBODIMENT

Figure 1A:
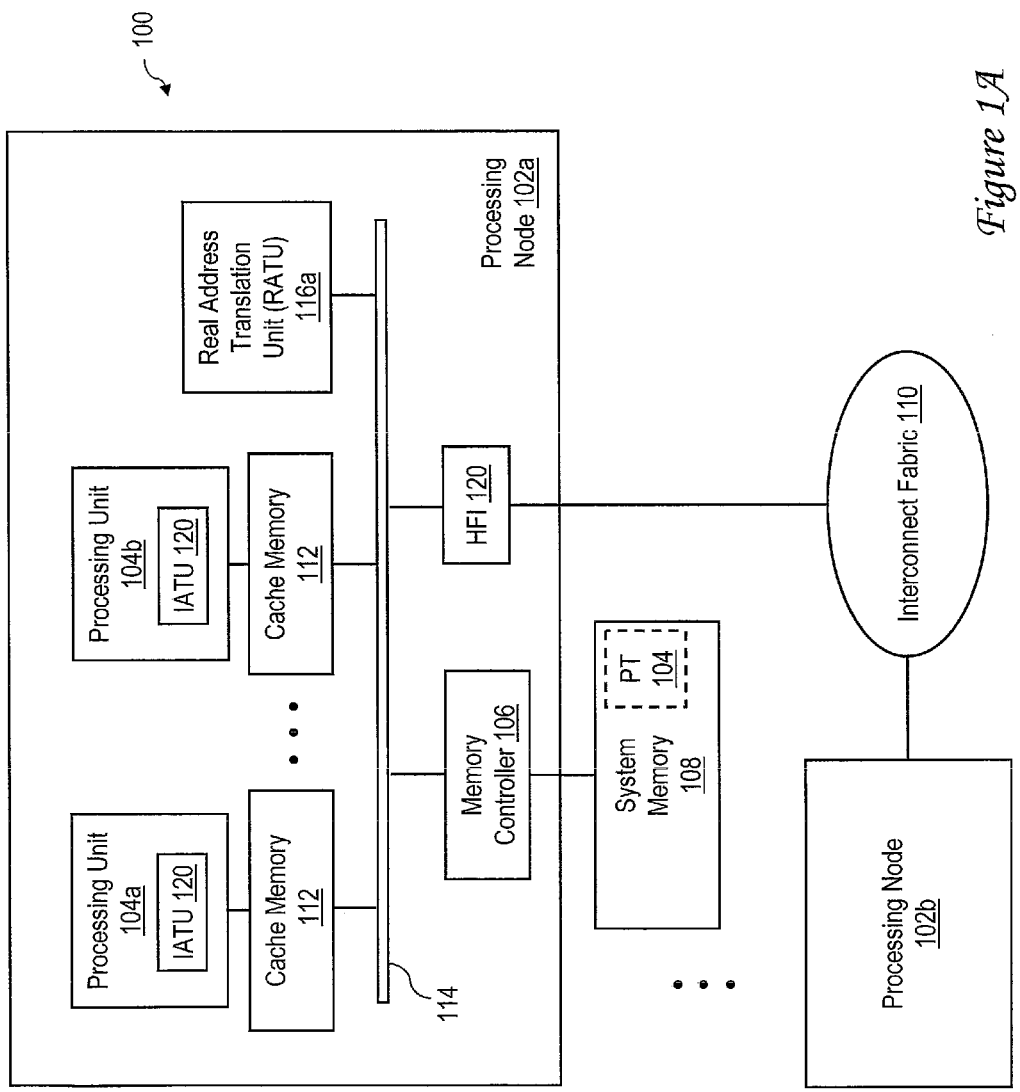
FIG. 1A is a high level block diagram of an exemplary embodiment of a data processing system in accordance with the present invention.

With reference now to the figures, wherein like reference numerals refer to like and corresponding parts throughout, and in particular with reference to FIG. 1A, there is illustrated a high-level block diagram depicting a first view of an exemplary data processing system 100 in accordance with the present invention. In the exemplary embodiment, data processing system 100 includes multiple processing nodes 102a, 102b for processing data and instructions. Processing nodes 102 are coupled via a host fabric interface (HFI) to an interconnect fabric 110 that supports data communication between processing nodes 102 in accordance with one or more interconnect and/or network protocols. Interconnect fabric 110 may be implemented, for example, utilizing one or more buses, switches and/or networks.

Each processing node 102 may be implemented, for example, as a single integrated circuit chip (e.g., system-on-a-chip (SOC)), multi-chip module (MCM), or circuit board, which contains one or more processing units 104 (e.g., processing units 104a, 104b) for processing instructions and data. Each processing unit 104 typically contains instruction sequencing logic, one or more execution units for executing instruction, as well as various buffers, registers and other circuitry all realized in integrated circuitry. In many embodiments, each processing unit 104 can concurrently execute multiple concurrent hardware threads of execution.

As shown, each processing unit 104 is supported by cache memory 112, which contains one or more levels of in-line or lookaside cache. As is known in the art, cache memories 112 provide processing units 104 with low latency access to instructions and data received from source(s) within the same processing node 104 and/or remote processing node(s) 104. The processing units 104 within each processing node 102 are further coupled to a local interconnect 114, which may be implemented, for example, with one or more buses and/or switches. Local interconnect 114 is further coupled to HFI 120 to support data communication between processing nodes 102.

As further illustrated in FIG. 1A, processing nodes 102 typically include at least one memory controller 106, which may be coupled to local interconnect 114 to provide an interface to a respective physical system memory 108. In alternative embodiments of the invention, one or more memory controllers 106 can be coupled to interconnect fabric 110 or directly to a processing unit 104 rather than a local interconnect 114.

According to the present invention, data processing system 100 implements memory virtualization utilizing at least three address spaces. These address spaces include a first address space employed by software, referred to herein as an effective address (EA) space, a second address space utilized to index cache memories 112, referred to herein as an intermediate address (IA) space, and a third address space utilized to address locations in system memory 108, referred to herein as a real address (RA) space. In common embodiments, the IA space will be larger than or equal in size to the RA space.

As will be appreciated, data processing system 100 may employ additional address spaces in addition to the three address spaces previously enumerated. For example, memory controller 106 may employ a further level of address translation to map RAs to physical locations within the storage devices (e.g., DIMMs) comprising system memory 108, and storage controllers (not illustrated) may employ a further level of address translation to map RAs to physical locations within the physical data storage media (e.g., solid state drives, optical or magnetic disks, tape, etc.).

In order to support translation of effective addresses (EAs) to intermediate addresses (IAs), each processing unit 104 preferably includes a hardware intermediate address translation unit (IATU) 120 that receives EAs as inputs and generates corresponding system-wide unique IAs utilized to access cache memories 112. IATU 120 is preferably able to translate the address for any cache line held in the associated cache memory 112 without a "miss" or the need to access any other translation facility. In some embodiments, IATU 120 is implemented as a translation cache that caches page table entries from an operating system-managed page table 104 in system memory 108. In such embodiments, the page table entry required to perform an EA-to-IA translation is retrieved from system memory 108, as needed, together with requested data. In other embodiments, IATU 120 may simply hash the EA utilizing a predetermined or software-controlled hashing algorithm to obtain an IA without accessing a page table 104. In yet other embodiments, IATU 120 may perform translation by concatenating EAs with a prefix (e.g., supplied by hardware, software or firmware) to obtain IAs.

Translation from intermediate addresses to real addresses is performed by a real address translation facility, such as real address translation unit (RATU) 116. In at least some embodiments, RATU 116 is a software-managed facility that is shared by multiple (or all) processing units 104 in a processing node 102 and is in communication with memory controller 106. RATU 116 may be implemented in any of, or a combination of hardware, software and/or firmware. Thus, in the embodiment of FIG. 1A, RATU 116a is implemented as hardware (e.g., special-purpose hardware or a dedicated processing unit 104) that executes program code to perform translation of intermediate addresses into real addresses. In the alternative embodiment depicted in FIG. 1B, RATU 116b is instead implemented in hardware and/or firmware within memory controller 106. In the alternative embodiment illustrated in FIG. 1C, IA-to-RA translation is implemented in software, for example, as RATU program code 116c executing on one or more processing units 104. For example, if multiple concurrent hardware threads of execution are supported, RATU program code 116c may execute as one of the hardware threads of execution of a processing unit 104 in order to provide IA-to-RA translation for one or more other hardware threads. These various embodiments of the real address translation facility are generally referred to herein as RATU 116.

The translation performed by RATU 116 may employ any known or future developed technique (or multiple techniques) of address translation. These techniques may include translation by references to software-managed page tables, accesses to hardware-managed translation caches, address hashing, etc. Following translation, RATU 116 outputs the real address for use in a memory access request targeting system memory 108. As will be appreciated, the form in which the real address is output by RATU 116 depends upon the selected implementation of RATU 116. If RATU 116 is implemented as hardware as depicted as RATU 116a of FIG. 1A, RATU 116a may output the real address in a memory access request on local interconnect 114. If RATU 116 is alternatively implemented in memory controller 106, as depicted with RATU 116b of FIG. 1B, RATU 116b may directly utilize the real address to access system memory 108 or utilize the real address to perform a further translation to a physical (e.g., DIMM) address. If RATU 116 is alternatively implemented in software as depicted with RATU 116c of FIG. 1C, RATU 116b may output the real address in a processor register, in a specified memory location (e.g., in cache memory 112) or in a message to cache memory 112. In this case, hardware in processing unit 104 and/or cache memory 112 can initiate a memory access request on local interconnect 114 that specifies the real address as the request address.

Figure 1B:
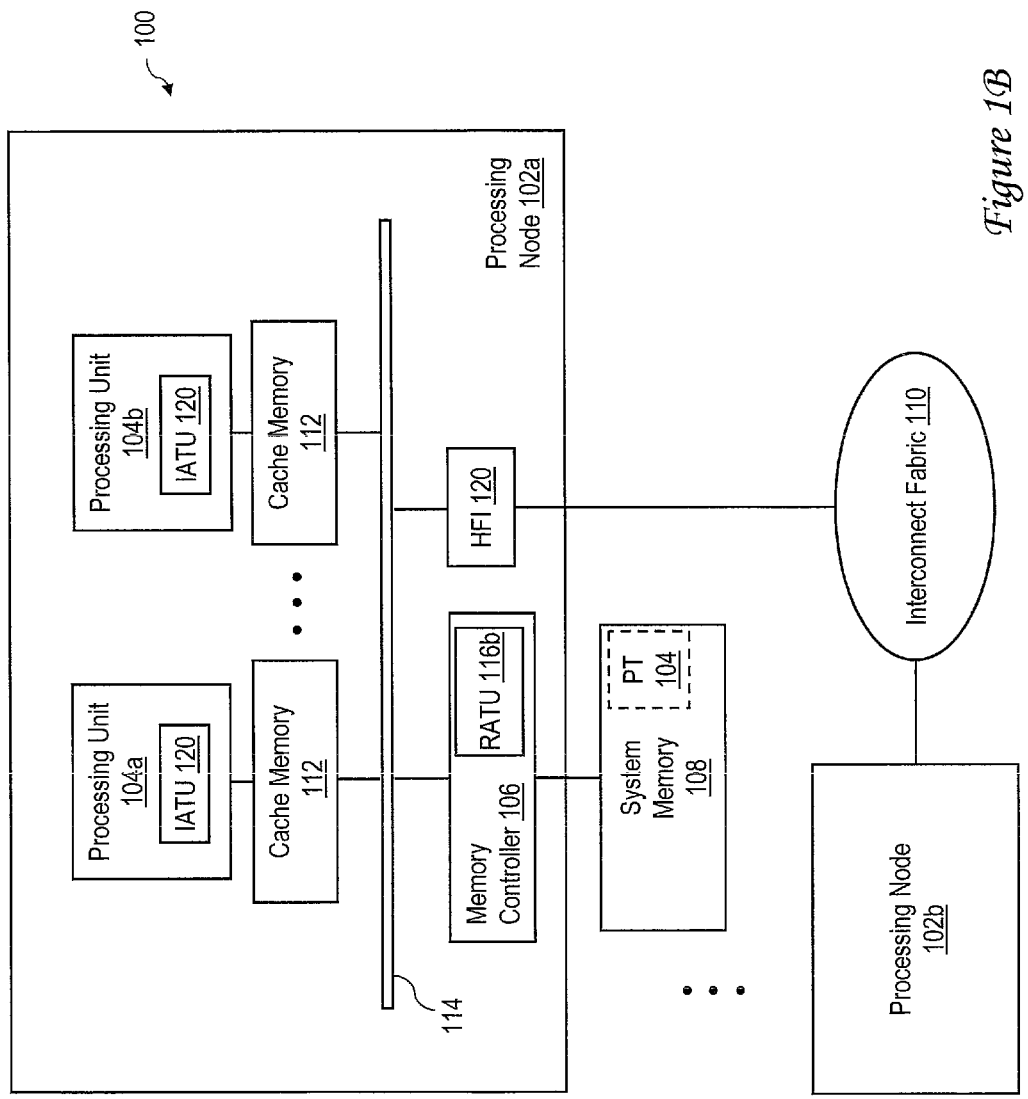
FIG. 1B is a high level block diagram of an alternative embodiment of a data processing system in accordance with the present invention.
Figure 1C:
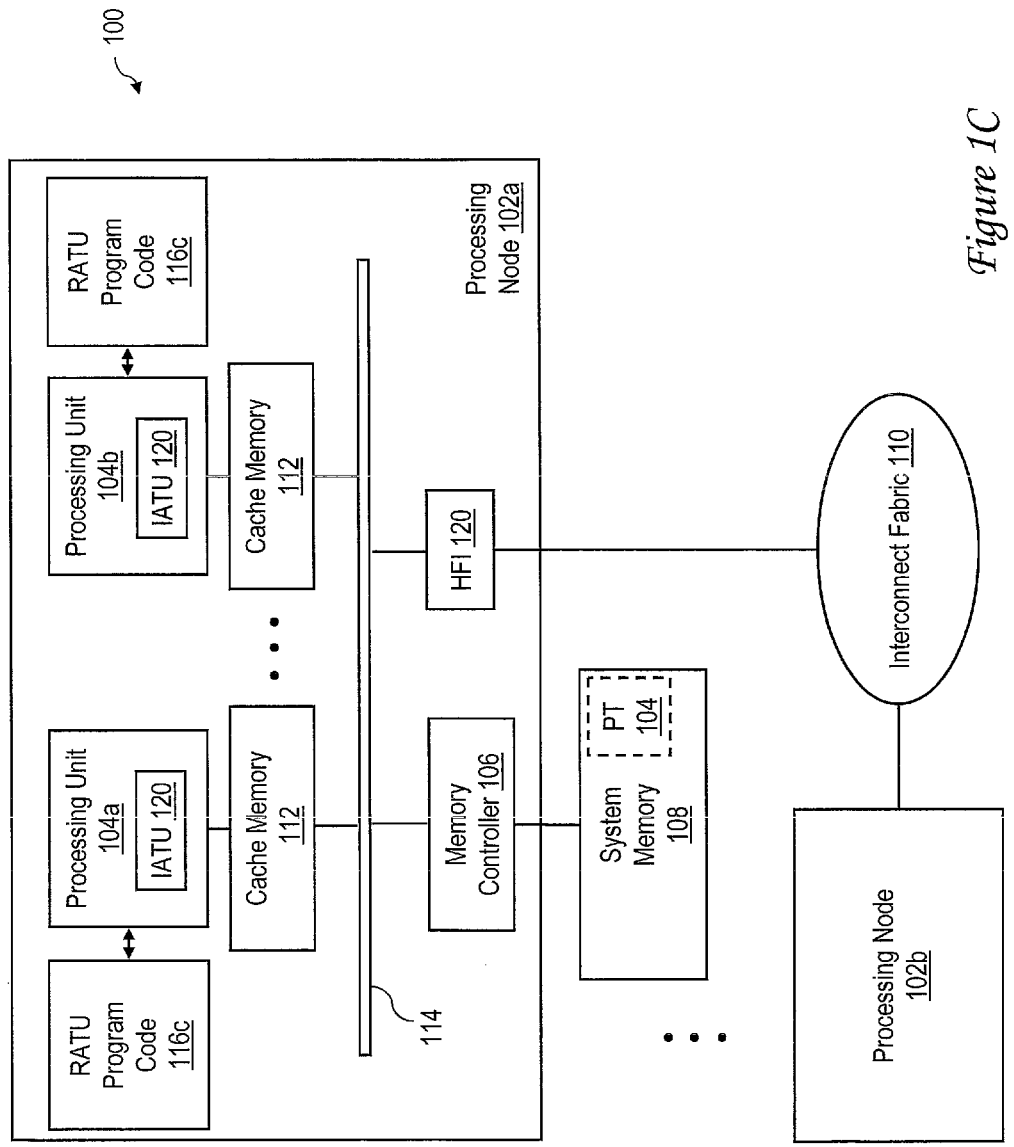
FIG. 1C is a high level block diagram of another alternative embodiment of a data processing system in accordance with the present invention.

Those skilled in the art will appreciate that processing system 100 as depicted in various embodiments in FIGS. 1A-1C can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein.

Figure 2:
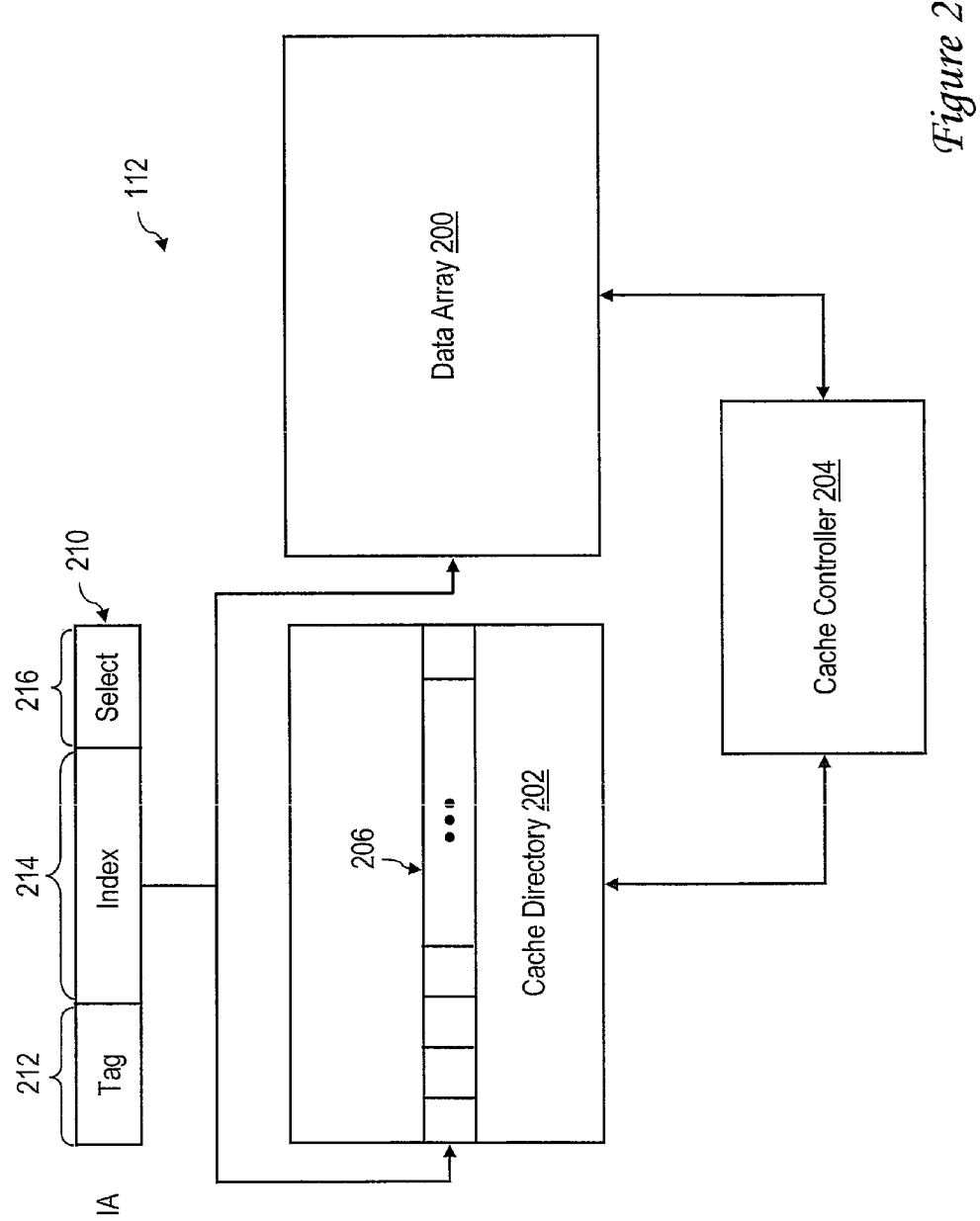
FIG. 2 is a more detailed block diagram of a cache memory as depicted in FIGS. 1A-1C.

Referring now to FIG. 2, there is depicted a more detailed block diagram of a cache memory 112 in accordance with the present invention. In the depicted embodiment, cache memory 112 includes one or more levels of data storage, where each such level includes a data array 200 for storing cache lines of data and/or instructions, a cache directory 202 that records the tag portion of the intermediate address (IA) and state information associated with each cache line held in data array 200, and a cache controller 204 that controls operation of cache memory 112.

During operation of data processing system 100, cache memory 112 can receive processor memory access requests from its associated processor 104, and in embodiments implementing snoop-based coherency, can also snoop interconnect memory access requests on local interconnect 114. As illustrated in FIG. 2, each such memory access request includes a request address specified as an intermediate address (IA) 210, which includes an address tag 212 formed of the high order address bit, an index 214 formed on the mid-order address bits, and low order select bits 216. As indicated, the index 214 of each intermediate address 210 received by cache 112 is utilized to select a particular one of a plurality of sets 206 in cache directory 202 and data array 200. As is known in the art, the address tag 212 of the intermediate address 210 is the utilized to determine which of the cache lines in the selected set, if any, is associated with requested intermediate address 210. Depending upon the type of memory access request and whether the request address hits in cache directory 202, cache controller 204 may, for example, supply requested data to the associated processor 104, store specified data in data array 200, issue a request on local interconnect 114, and/or update a cache line status within cache directory 202. In the case of a memory access request issued on local interconnect 114 to access system memory 108, the request address of the memory access request is translated into a real address, for example, by RATU 116.

Figure 3:
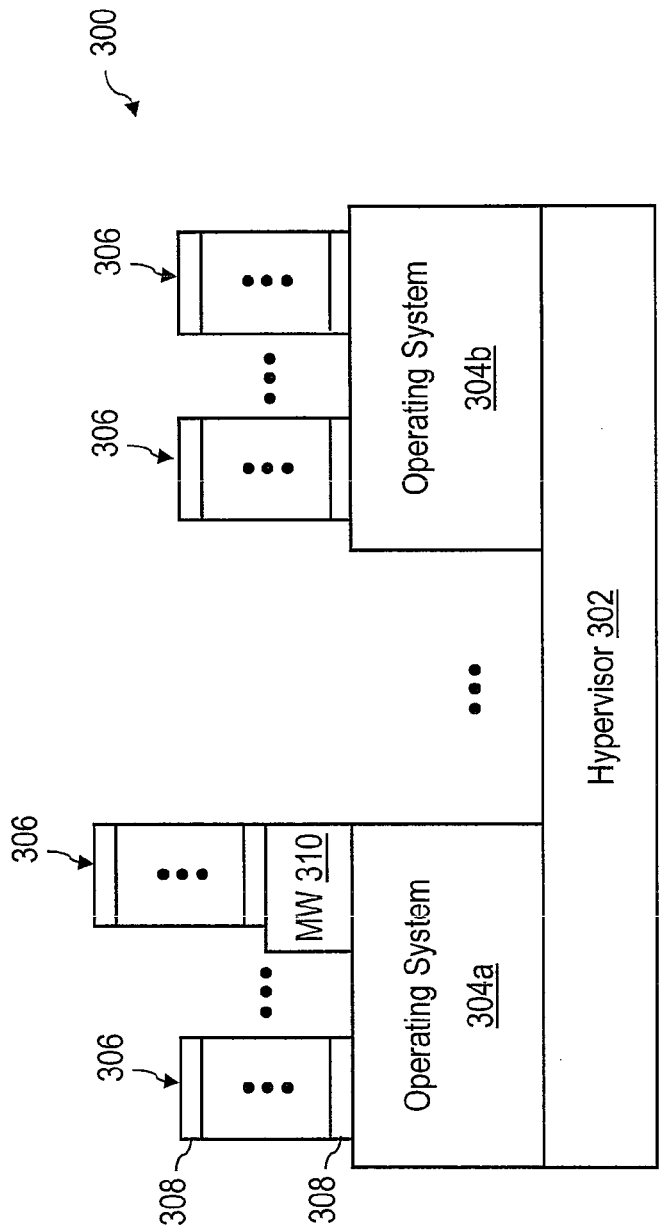
FIG. 3 is a software layer diagram of an exemplary software environment for a data processing system in accordance with any of FIGS. 1A-1C.

With reference now to FIG. 3, there is illustrated a software layer diagram of an exemplary software configuration 300 of data processing system 100 as embodied in any of FIGS. 1A-1C. As illustrated, software configuration 300 has at its lowest level a system supervisor (or hypervisor) 302 that allocates resources among one or more possibly heterogeneous operating systems 304a, 304b concurrently executing within data processing system 100. The resources allocated to each operating system image 304 may include hardware resources, such as processing units 104, network adapters, non-volatile storage, etc., as well as specified ranges of effective, intermediate and real/or address spaces.

As further shown in FIG. 3, each operating system image 304 allocates addresses and other resources from the pool of resources allocated to it by hypervisor 304 to various application programs 306 and/or middleware (MW) 310. Application programs 306, which can be programmed to perform any of a wide variety of computational, control, communication, data management and presentation functions, comprise a number of user-level processes 308. Each operating system image 304 independently controls the operation of the hardware allocated to it, creates and manages a page table 104, if present, governing EA-to-IA and/or IA-to-RA translation, and provides various application programming interfaces (API) through which operating system services can be accessed by application programs 164 and middleware 310.

Figure 4:
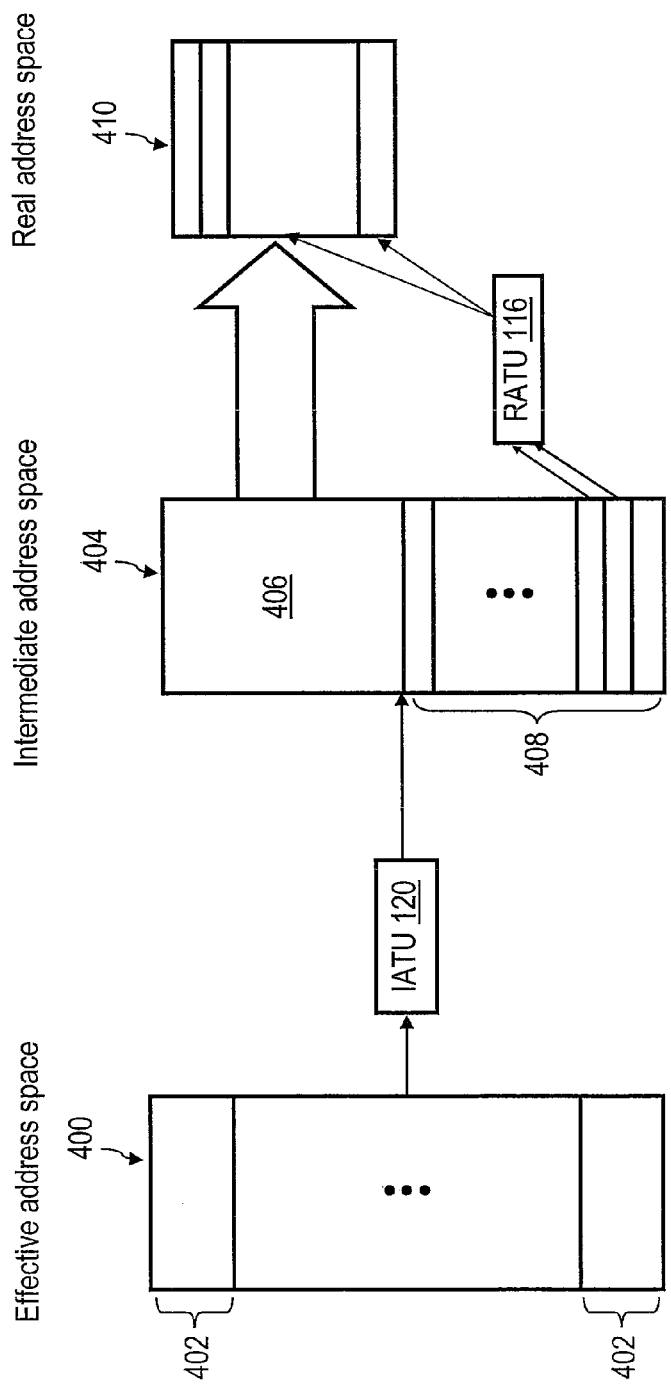
FIG. 4 depicts an address translation schema from effective-to-intermediate addresses and from intermediate-to-real addresses in accordance with the present invention.

Referring now to FIG. 4, there is depicted an exemplary address translation schema in accordance with the preset invention. In the depicted embodiment, the effective address (EA) space 400 comprises a plurality of memory pages 402. Memory pages 402 may have any of a number of possibly different page sizes (e.g., 4 KB, 64 KB, 1 MB, 16 MB, 1 GB, 16 GB, etc.), or alternatively, may all have uniform page size (e.g., 16 GB). As described above and as shown in FIG. 4, EAs in EA space 400 that are specified by memory access requests of processing units 104 are translated by IATUs 120 into intermediate addresses (IAs) within IA space 404.

IAs within IA space 404 can be translated to real addresses (RAs) within RA space 410 in multiple ways. For example, as shown in FIG. 4, in some embodiments IA space 404 includes a direct mapped region 406 containing IAs that map directly, with or without a hash, to RAs in RA space 410 with one-to-one correspondence. In such cases, the request addresses of memory access requests to system memory 108 can readily be obtained by processing units 104 and/or cache memories 112 directly from the IAs generated by IATUs 120 without translation by RAU 116. The portion of IA space 404 within direct mapped region 406 may be indicated, for example, by one or more address range registers in processing units 104 and/or cache memories 112. Additionally, for IAs in a translated region 408 of IA space 404, RATU 116 is invoked to perform IA-to-RA translation. It should be noted that in preferred embodiments translation by RATU 116 is only employed, as needed, for memory access requests to system memory 108, and is therefore generally performed for only a small percentage of the total number of memory access requests. As with EA-to-IA translation, the IA-to-RA translations performed by RATU 116 can be performed with any desired address granularity (e.g., 4 KB, 64 KB, 1 MB, 16 MB, 1 GB, 16 GB, etc.).

As has been described, in at least some embodiments the present invention provides an improved address translation schema in which an intermediate address translation unit is utilized to translate effective addresses of processing unit memory accesses into intermediate addresses utilized to access cache memory, and a real address translation unit, which may be shared by multiple hardware threads of execution, is utilized to translate intermediate addresses into real addresses utilized to access system memory. This translation schema simplifies and reduces the die area of the circuitry utilized to implement address translation by moving the hardware real address translation structures (e.g., the SLB and TLB) out of each processing core and centralizing their functionality in a real address translation unit.

While embodiments of the present invention have been particularly shown and described, it will be understood by those skilled in the art that various changes in form and detail may be made therein without departing from the spirit and scope of the invention. For example, although aspects of the present invention have been described with respect to a data processing system executing program code that directs the functions of the present invention, it should be understood that present invention may alternatively be implemented as a program product for use with a data processing system. Program code defining the functions of the present invention can be delivered to a data processing system via a variety of signal-bearing media, which include, without limitation, data storage media (e.g., CD-ROM, hard disk drive, static memory), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of data processing in a data processing system, said method comprising:
in response to a memory access request of a processing unit of the data processing system, the memory access request specifying an effective address:
an intermediate address translation unit in the data processing system translating the effective address of the memory access request into an intermediate address;
accessing a cache memory of the data processing system utilizing the intermediate address;
in response to the accessing resulting in a hit of the intermediate address in the cache memory, the cache memory performing a memory access specified by the memory access request in a data array of the cache memory, wherein performing the memory access includes:
if the memory access request is a first type, supplying requested data stored within the data array to the processing unit to satisfy the memory access request;
if the memory access request is a second type, storing data specified by the memory access request into the data array to satisfy the memory access request; and
in response to the accessing resulting in a miss of the intermediate address in the cache memory, translating the intermediate address into a real address with a real address translation unit that performs address translation for multiple hardware threads of execution and accessing a system memory with the real address.

2. The method of claim 1, wherein:
said cache memory includes a plurality of sets; and
accessing the cache memory comprises indexing into a particular set among the plurality of sets in the cache memory utilizing the intermediate address.

3. The method of claim 1, wherein:
the processing unit is one of multiple processing units in the data processing system; and
the real address translation unit comprises one of the multiple processing units.

4. The method of claim 1, wherein:
the data processing system includes a memory controller that manages access to the system memory; and
the memory controller includes the real address translation unit.

5. The method of claim 1, wherein the effective address belongs to an effective address space comprising a plurality of uniformly sized memory pages.

6. The method of claim 1, wherein:
the intermediate address comprises a first intermediate address;
the real address comprises a first real address;
an intermediate address space includes a translated region containing the first intermediate address and a direct mapped region containing a second intermediate address; and
said method further comprises in response to a miss in cache memory with said second intermediate address, obtaining a second real address corresponding to the second intermediate address without performing intermediate-to-real address translation utilizing the real address translation unit.

7. The method of claim 1, wherein said step of translating the intermediate address into a real address comprises translating the intermediate address into the real address only in response to a miss of the intermediate address in the cache memory and refraining from translating the intermediate address into the real address in response to a hit of the intermediate address in the cache memory.

8. The method of claim 1, wherein:
said cache memory includes a plurality of sets each containing multiple entries; and
said method further comprises translating any effective address corresponding to any entry in said cache memory without referencing any translation facility external to the intermediate address translation unit following receipt of the effective address.

9. The method of claim 1, wherein translating the effective address comprises translating the effective address of the memory access request into an intermediate address by reference to a page table entry.

10. A data processing system, comprising:
a processing unit being capable of concurrently executing multiple hardware threads of execution;
an intermediate address translation unit in said processing unit that, responsive to a memory access request of the processing unit, translates effective addresses of the memory access request into an intermediate address;
a cache memory coupled to the processing unit, said cache memory including a data array, a directory of the data array that is accessed utilizing the intermediate address, and a cache controller, wherein responsive to a hit of the intermediate address in the cache directory, the controller performs a memory access specified by the memory access request in the data array by supplying requested data stored within the data array to the processing unit to satisfy the memory access request if the memory access request is a first type and by storing data specified by the memory access request into the data array to satisfy the memory access request if the memory access request is a second type;
a real address translation unit that performs address translation for multiple hardware threads of execution by translating intermediate addresses that miss in the cache memory into real addresses; and
a system memory, coupled to the at least one processing unit, that is accessed utilizing real addresses.

11. The data processing system of claim 10, wherein:
said cache memory includes a plurality of sets; and
each set among the plurality of sets in the cache memory is indexed utilizing a respective one of a plurality of intermediate address indices.

12. The data processing system of claim 10, wherein:
said at least one processing unit comprises multiple processing units; and
the real address translation unit comprises one of the multiple processing units.

13. The data processing system of claim 10, wherein:
the data processing system includes a memory controller that manages access to the system memory; and
the memory controller includes the real address translation unit.

14. The data processing system of claim 10, wherein the effective address belongs to an effective address space comprising a plurality of uniformly sized memory pages.

15. The data processing system of claim 10, wherein:
an intermediate address space includes a translated region and a direct mapped region; and
at least one of a set including the at least one processing unit and the cache memory comprises means, responsive to a miss in cache memory of an intermediate address within the direct mapped region, for obtaining a real address corresponding to the intermediate address without performing intermediate-to-real address translation utilizing the real address translation unit.

16. The data processing system of claim 10, wherein the real address translation unit translates the intermediate address into a real address only in response to a miss in cache memory.

17. The data processing system of claim 10, wherein:
said cache memory includes a plurality of sets each containing multiple entries; and
said intermediate address translation unit is capable of translating any effective address corresponding to any entry in said cache memory without referencing any translation facility external to the intermediate address translation unit following receipt of the effective address.

18. The data processing system of claim 10, wherein said intermediate address translation unit translates the effective address of the memory access into an intermediate address by reference to a page table entry.

* * * * *